US008957564B1

(12) United States Patent
Hiroe et al.

(10) Patent No.: US 8,957,564 B1
(45) Date of Patent: Feb. 17, 2015

(54) MICROELECTROMECHANICAL SYSTEM MEGASONIC TRANSDUCER

(75) Inventors: Toshio Hiroe, Hazukashi (JP); Zarem Harold, Palo Alto, CA (US); Alexander Payne, Ben Lomond, CA (US); James Hunter, Campbell, CA (US)

(73) Assignee: Silicon Light Machines Corporation, Sunnyvale, CA (US)

( * ) Notice: Subject to any disclaimer, the term of this patent is extended or adjusted under 35 U.S.C. 154(b) by 876 days.

(21) Appl. No.: 13/172,514

(22) Filed: Jun. 29, 2011

Related U.S. Application Data

(60) Provisional application No. 61/359,519, filed on Jun. 29, 2010.

(51) Int. Cl.
*H02N 2/00* (2006.01)
*B08B 3/12* (2006.01)

(52) U.S. Cl.
USPC .................. 310/309; 134/1; 134/1.2; 134/1.3

(58) Field of Classification Search
CPC ............... H01L 121/67011; H01L 121/67017; B08B 3/12; H02N 1/006; H02N 1/08
USPC ........................................ 310/309; 134/1–1.3
See application file for complete search history.

(56) References Cited

U.S. PATENT DOCUMENTS

| | | | | |
|---|---|---|---|---|
| 5,894,452 | A | 4/1999 | Ladabaum et al. | |
| 6,791,242 | B2 | 9/2004 | Beck et al. | |
| 7,614,406 | B2 | 11/2009 | Bran | |
| 7,846,102 | B2 | 12/2010 | Kupnik et al. | |
| 8,585,825 | B2 * | 11/2013 | Peng et al. | 134/1.3 |
| 2007/0068558 | A1 * | 3/2007 | Papanu et al. | 134/29 |
| 2011/0048475 | A1 | 3/2011 | Sinha | |
| 2012/0273363 | A1 * | 11/2012 | Holsteyns et al. | 205/143 |
| 2013/0000669 | A1 * | 1/2013 | Sinha | 134/1.3 |
| 2014/0026923 | A1 * | 1/2014 | Beck | 134/1.3 |

* cited by examiner

*Primary Examiner* — Thomas Dougherty
(74) *Attorney, Agent, or Firm* — William Nuttle

(57) ABSTRACT

Megasonic cleaning systems and methods of fabricating and using the same are provided. In one embodiment, the system comprises a plurality of Micro-Electromechanical System (MEMS) transducers, each transducer including a movable membrane with a membrane electrode coupled to a first potential disposed above and spaced apart from an upper surface of a die including a cavity electrode coupled to a second potential, the membrane including multiple layers including a polysilicon layer between a top silicon nitride layer and a bottom silicon nitride layer, and the membrane electrode includes the polysilicon layer; a chuck on which a target workpiece is positioned; and a fluid to couple sonic energy from the plurality of MEMS transducers to the target workpiece. Other embodiments are also provided.

13 Claims, 10 Drawing Sheets

MICROELECTROMECHANICAL SYSTEM MEGASONIC TRANSDUCER

CROSS-REFERENCE TO RELATED APPLICATIONS

The present application claims the benefit of priority under 35 U.S.C. 119(e) to U.S. Provisional Patent Application Ser. No. 61/359,519 entitled "Microelectromechanical System Megasonic Transducer," filed Jun. 29, 2010, which application is hereby incorporated by reference in its entirety.

TECHNICAL FIELD

The present invention relates generally to sonic transducers, and more particularly to megasonic systems including MicroElectroMechanical System (MEMS) transducers and to methods of fabricating and using the same.

BACKGROUND

Sonic transducers are widely used for a number of applications including medical imaging, cleaning systems or scrubbers used in fabricating semiconductor or Micro-Electromechanical System (MEMS) devices. In a typical cleaning system substrates, such as silicon wafers, are immersed in a liquid to which sonic energy is applied. High intensity sound waves generate pressure fluctuations that lead to cavitation, a condition in which millions of microscopic bubbles rapidly form and collapse in the liquid. The collapse of these cavitation bubbles produce shock waves that impinge on substrate surfaces, dislodging particles thereon. Conventional cleaning systems use typically piezoelectric transducers operating at ultrasonic frequencies of less than about 400 kHz to apply sonic energy to the liquid. However, as the sizes of elements or features in semiconductor circuit MEMS devices continues to shrink, the trend in sonic cleaning systems has been toward transducers capable of operating at higher frequencies, which produce smaller cavitation bubbles that increase the cleaning effectiveness, and provide a more gentle cleaning while reducing probability of damage to the substrate. Unfortunately, the operating frequency or resonant frequency of piezoelectric transducers is determined by a film thickness of the piezoelectric material and is generally limited to the ultrasonic or low megasonic frequency range.

Accordingly, there is a need for a transducer suitable for use in cleaning systems and capable of operating over the full megasonic range.

SUMMARY

Megasonic cleaning systems and methods of fabricating and using the same are provided.

In one embodiment, the system comprises a plurality of Micro-Electromechanical System (MEMS) transducers, each transducer including a movable membrane with a membrane electrode coupled to a first potential disposed above and spaced apart from an upper surface of a die including a cavity electrode coupled to a second potential, the membrane including multiple layers including a polysilicon layer between a top silicon nitride layer and a bottom silicon nitride layer, and the membrane electrode includes the polysilicon layer; a chuck on which a target workpiece is positioned; and a fluid to couple sonic energy from the plurality of MEMS transducers to the target workpiece.

In another embodiment, the method comprises: (i) providing a plurality of MEMS transducers, each transducer including a movable membrane with a membrane electrode coupled to a first potential disposed above and spaced apart from an upper surface of a die including a cavity electrode coupled to a second potential; (ii) positioning a target workpiece on a chuck; (iii) applying a drive voltage between the membrane electrodes and cavity electrodes to operate the plurality of MEMS transducers at a megasonic resonant frequency; and (iv) coupling sonic energy to the target workpiece from the plurality of MEMS transducers through a fluid.

Optionally, the system can further include a driver, and applying the drive voltage can include applying the drive voltage with a fixed phase delay in the voltage applied between individual transducers or groups of MEMS transducers to allow focusing or sweeping of the sonic energy.

BRIEF DESCRIPTION OF THE DRAWINGS

These and various other features of including MicroElectroMechanical System (MEMS) based megasonic systems and methods of operating the same will be apparent upon reading of the following detailed description in conjunction with the accompanying drawings and the appended claims provided below, where:

DETAILED DESCRIPTION

Figure 1:
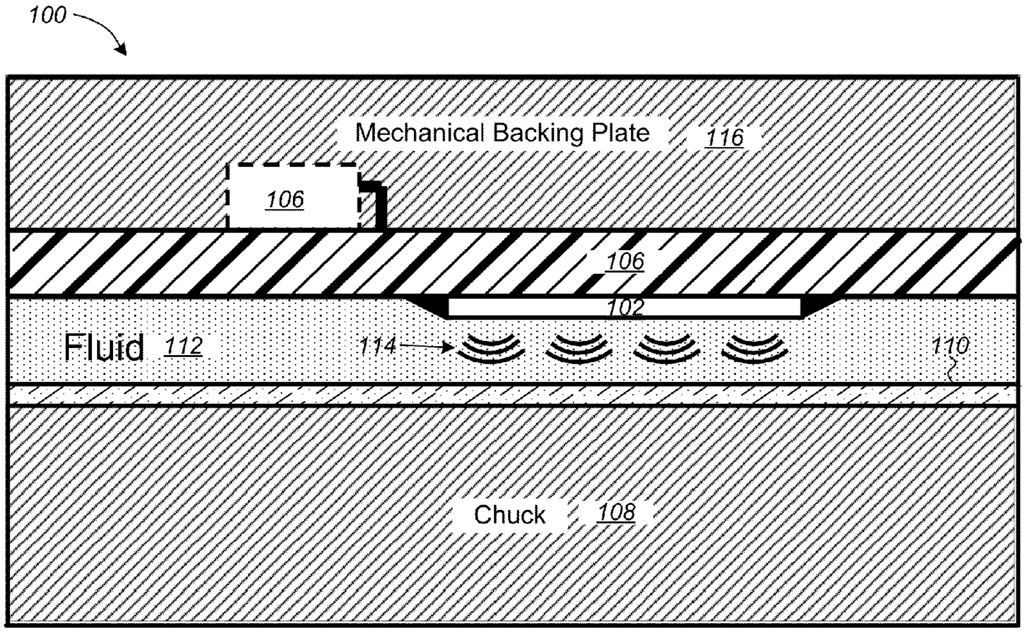
FIG. 1 is a schematic block diagram of a megasonic system including MicroElectroMechanical System (MEMS) based transducer according to an embodiment of the present disclosure.

The present invention is directed to megasonic systems including MicroElectroMechanical System (MEMS) transducers, and to methods of fabricating and using the same.

A megasonic systems and methods according to the present invention will now be described with reference to FIGS. 1 through 16. For purposes of clarity, many of the details of megasonic systems in general and megasonic cleaning systems in particular that are widely known and are not relevant to the present invention have been omitted from the following description. The drawings described are only schematic and are non-limiting. In the drawings, the size of some of the elements may be exaggerated and not drawn to scale for illustrative purposes. The dimensions and the relative dimensions may not correspond to actual reductions to practice of the invention.

Referring to FIG. 1, in one exemplary embodiment the megasonic system 100 includes a number of a voltage controlled Micro-Electromechanical System (MEMS) transducers arranged in an array on a MEMS die 102. Each individual MEMS transducer (not shown in this figure) includes a movable membrane with a membrane electrode coupled to a first potential, said membrane disposed above and spaced apart from an upper surface of a die including a cavity electrode coupled to a second potential. The MEMS die 102 is physically attached to a circuit board or printed circuit board (PCB 104), and electrically coupled through the PCB to a driver 106 adapted to provide a drive signal or drive voltage between the membrane electrodes and cavity electrodes at a frequency selected to operate the MEMS transducers at a predetermined megasonic resonant frequency. The system 100 further includes a chuck 108 on which a target workpiece 110, such as substrate or wafer, is positioned proximal to the MEMS transducers, and a fluid 112 to couple sonic energy 114 from the MEMS transducers to the target workpiece. The fluid 112 can be contained in a bath or reservoir (not shown in this figure) in which both the MEMs die 102 and target workpiece 110 are immersed or exposed, or can include a jet or stream of fluid to which sonic energy is coupled that is then directed at the target workpiece. The fluid 112 can include an aqueous or organic compound, such as water or other solvents depending on the target workpiece 110 and the type of contamination to be removed.

Optionally, as in the embodiment shown the megasonic system 100 further includes a stiff, mechanical backing plate 116 to which the PCB 104 is attached, substantially enclosing the driver 106 and a back surface of the PCB. The backing plate 116 provides rigidity and flatness to the PCB 104 and MEMS die 102, which is desirable for maintaining a front or top surface of the MEMS die within close proximity to the target workpiece 110 to increase cleaning efficiency without risk of damage to either the target workpiece or the MEMS die. By close proximity it is meant a distance of about 100 micrometers (μm) or less.

Figure 2:
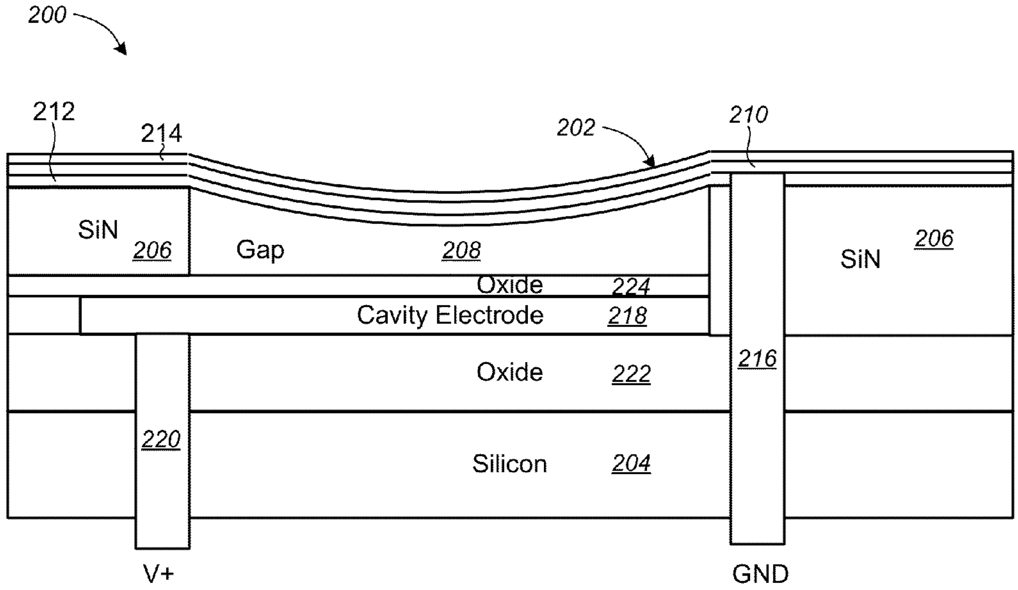
FIG. 2 is a schematic block diagram in cross-sectional view of a MEMS transducer according to an embodiment of the present disclosure.

A MEMS transducer will now be described with reference to FIG. 2. Referring to FIG. 2, a MEMS transducer 200 generally includes a movable membrane 202 suspended above an upper surface of a MEMS die 204 by a plurality of support structures 206, such as posts or sidewalls of a cavity 208 formed in the die. In addition to the aforementioned membrane electrode, the movable membrane 202 includes a number of taut layers of dielectric material surrounding or enclosing the membrane electrode. For example, in the embodiment shown the movable membrane 202 includes a membrane electrode 210 including one or more layers of a high-temperature conductive material, such as polysilicon (poly), tungsten (W) or tungsten-silicide ($WiSi_2$), overlying a bottom silicon nitride ($Si_3N_4$) layer 212, and overlaid by top silicon nitride layer 214. Although, the intrinsic stress of a polysilicon membrane electrode 210 is approximately zero, the intrinsic stress of the silicon nitride layers 212, 214 is high, on the order of about 1 gigapascal (GPa) or more, sufficient to provide a substantially flat, elastic movable membrane 202. The membrane electrode 210 is electrically coupled to a first potential by one or more vertical contacts 216 extending through the MEMS die 204 to a backside or surface thereof. As noted above, the MEMS transducer 200 further includes a bottom or cavity electrode 218 towards which the membrane electrode can be attracted to move the movable membrane 202. The cavity electrode 214 also includes a high-temperature conductive material, such as polysilicon (poly), tungsten (W) or tungsten-silicide ($WiSi_2$), and is electrically coupled to a second potential a local interconnect (LM1) formed on or over a surface of the MEMS die 204, and/or one or more vertical contacts 220 extending through the MEMS die. Generally, the cavity electrode 218 is over a first dielectric layer 222, such as an oxide or silicon dioxide, formed on the surface of the MEMS die 204 and covered by a second dielectric layer 224, such as an oxide or silicon dioxide.

Figure 3:
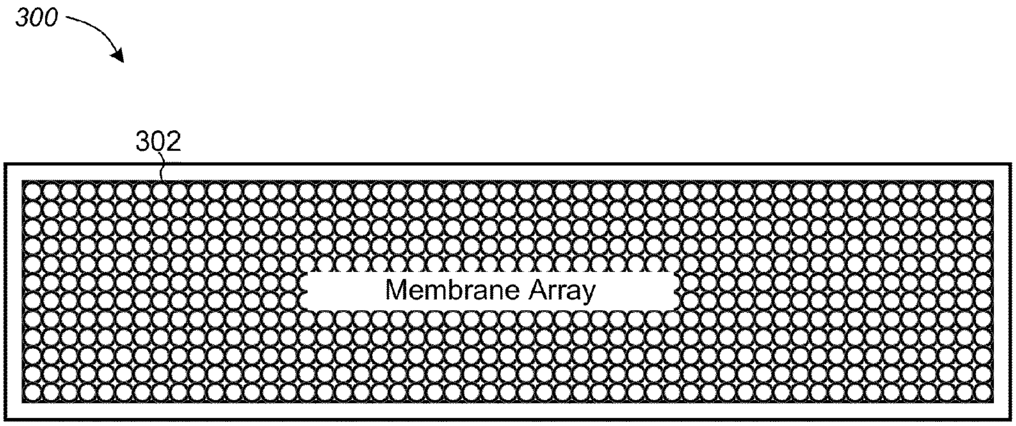
FIG. 3 is a top plan view of an array of MEMS transducer according to an embodiment of the present disclosure.

A significant advantage of the MEMS transducers of the present invention over conventional piezoelectric transducers is the ability to fabricate a large number of MEMS transducers in a close packed array, or number of arrays on a single MEMS die. MEMS or membrane densities of up to about $10^4$ membranes per $cm^2$ can be readily achieved using current MEMS fabrication techniques. This enables a megasonic system of the present invention to provide much higher power densities, as we as a more uniform or controlled distribution of sonic energy. Referring to FIG. 3, in one exemplary embodiment the membrane or MEMS array 300 includes a single large, 10×40 mm, 4 $cm^2$ array of about $4\times10^4$ membranes. In the figure shown the surface of the MEMS array 300 is filled with close packed membranes 302. In certain embodiments all the membrane electrodes are shorted to each other and all the cavity electrodes shorted to each other to provide low electrical resistance, same phase operation and just two electrical connections, power (V+) and ground (GND), thereby simplifying the electrical connection to the PCB.

Optionally, in other embodiments, described in greater detail below, the membrane electrodes and/or the cavity electrodes are not all shorted to each other, but are coupled to individual MEMS transducers or groups of MEMS transducers to enable a fixed or variable phase delay to be applied to the drive signal, thereby focusing or sweeping of the sonic energy.

Figure 4:
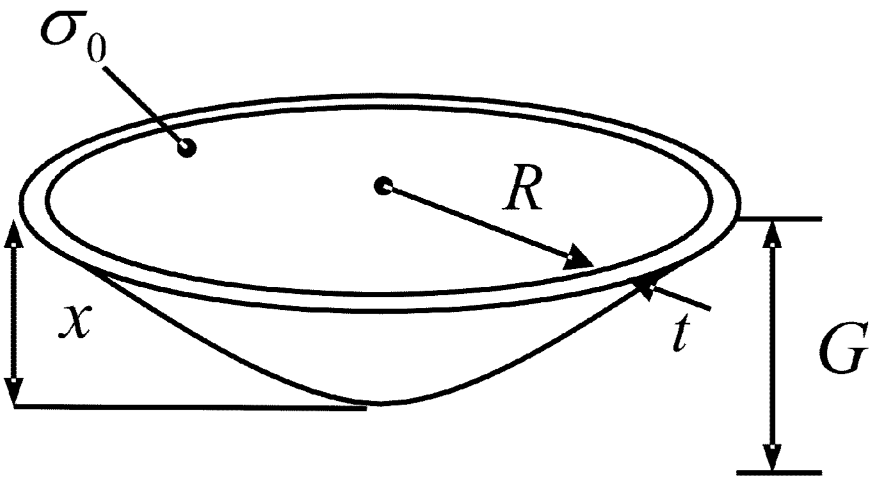
FIG. 4 is a schematic block diagram in perspective view of a membrane of a MEMS transducer according to an embodiment of the present disclosure.

The precise electrical voltage V+ or difference between the first and second potentials required, as well as the maximum desired frequency with which the MEMS transducers can be made to operate will depend on gap between the membrane and the MEMS die surface, as well as the physical parameters of the membranes themselves. A schematic block diagram of a perspective view of a membrane of a MEMS transducer is shown in FIG. 4. Referring to FIG. 4, it is has been found that where the membrane includes a substantially circular surface, a diameter (2R) of from about 3 to about 100 μm will provide the MEMS transducers with a predetermined resonant frequency in a range of from about 3 to about 10 megahertz (MHz). It has further been found that, depending on the diameter of the membrane, operating voltages can be kept to less than about 50V for gaps or between 0.4 to about 0.8 μm. Additional membrane parameters of exemplary embodiments are summarized in Table I below.

TABLE I

| | | 30 um | 40 um | 50 um | 80 um | 100 um |
|---|---|---|---|---|---|---|
| Radius | um | 15 | 20 | 30 | 40 | 50 |
| Membrane thickness | um | 0.10 | 0.12 | 0.16 | 0.18 | 0.20 |
| Linear displacement | um | 0.10 | 0.13 | 0.15 | 0.18 | 0.20 |
| Gap thickness | um | 0.40 | 0.50 | 0.60 | 0.70 | 0.80 |
| Stress | GPa | 1.0 | 1.0 | 1.0 | 1.0 | 1.0 |
| Si3N4 modulus | GPa | 270 | 270 | 270 | 270 | 270 |
| Poissan ratio | — | 0.25 | 0.25 | 0.25 | 0.25 | 0.25 |
| Biaxial modulus | Pa | 360 | 360 | 360 | 360 | 360 |
| Density | kg/m$^3$ | 3440 | 3440 | 3440 | 3440 | 3440 |
| Drive voltage | V | 44 | 50 | 50 | 50 | 51 |
| Stiffness | N/m | 658 | 785 | 1034 | 1155 | 1278 |
| Force | N | 6.5E−05 | 9.6E−05 | 1.5E−04 | 2.0E−04 | 2.5E−04 |
| Max Energy | pJ | 3 | 6 | 11 | 17 | 25 |
| Resonant Frequency | MHz | 11.4 | 8.6 | 5.7 | 4.3 | 3.4 |
| Power (per resonator) | mW | 0.04 | 0.05 | 0.06 | 0.07 | 0.09 |
| Power density | W/cm$^2$ | 3.8 | 3.0 | 1.7 | 1.1 | 0.8 |
| Displacement volume | pL | 0.04 | 0.08 | 0.21 | 0.44 | 0.79 |
| Effective mass | kg | 1.2E−13 | 2.6E−13 | 7.8E−13 | 1.6E−12 | 2.7E−12 |
| Velocity | m/s | 1.1 | 1.1 | 0.9 | 0.8 | 0.7 |

Figure 5:
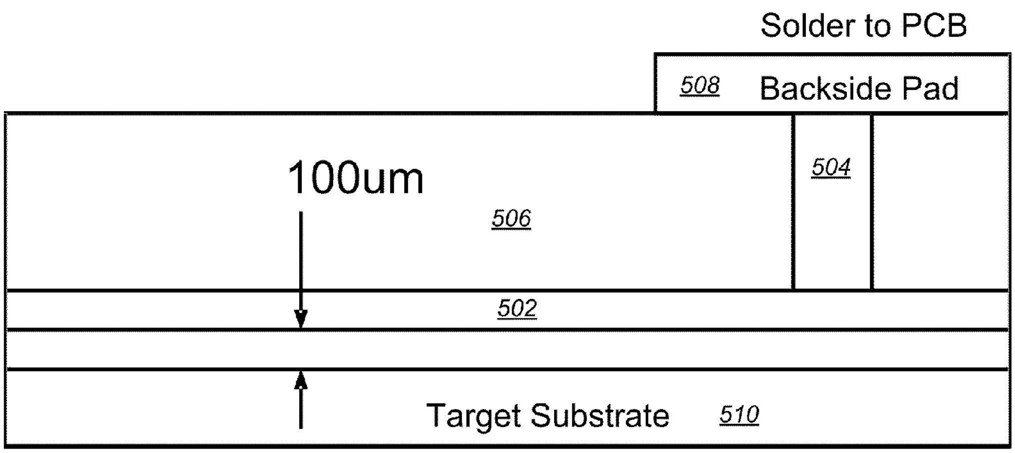
FIG. 5 is a schematic block diagram in cross-sectional view of a portion of a megasonic system illustrating an electrical connection of a MEMS die through a via in a circuit board according to an embodiment of the present disclosure.

In certain embodiments, it is desirable that a top or membrane surface of the MEMS die be placed in close proximity to the target workpiece, and therefore more usual top surface electrical contacts to the MEMS die cannot be used. Accordingly, in another aspect of the present invention a method of forming electrical contacts that do not extend substantially above a plane of the top surface of the MEMS die is provided. Referring to FIG. 5, in one embodiment a MEMS die 502 is electrically coupled to a driver (not shown) through a number of silicon vias 504 extending through a PCB 506 to backside pads 508 on a back surface of the PCB, thereby enabling a separation of about 100 μm, or less, to be maintained between a top surface of the MEMS die and a target workpiece 510.

Figure 6:
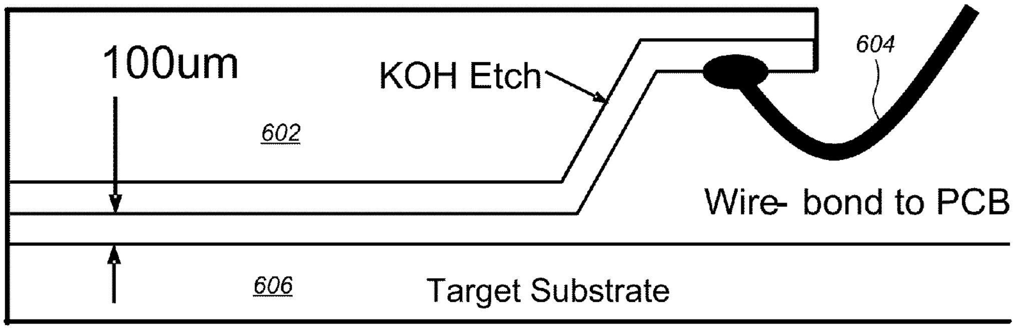
FIG. 6 is a schematic block diagram in cross-sectional view of a portion of a megasonic system illustrating an electrical connection of a MEMS die to a circuit board through a wirebond and perimeter etching according to another embodiment of the present disclosure.

In another embodiment, shown in FIG. 6, a perimeter of a MEMS die 602 is etched, for example by using a potassium hydroxide (KOH) wet etch, to enable the die to be electrically coupled a PCB (not shown in this figure) by wire-bonds 604, thereby while still enabling a separation of about 100 μm to be maintained between a top surface of the MEMS die and a target workpiece 606.

Figure 7A:
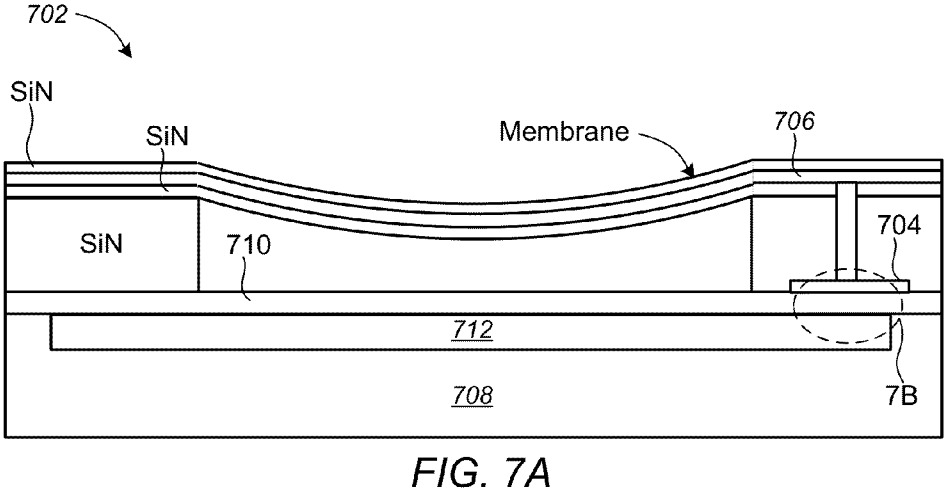
FIG. 7A is a schematic diagram in plan view of an interconnect grid for membrane electrodes of a MEMS transducer including according to an embodiment of the present disclosure.
Figure 7B:
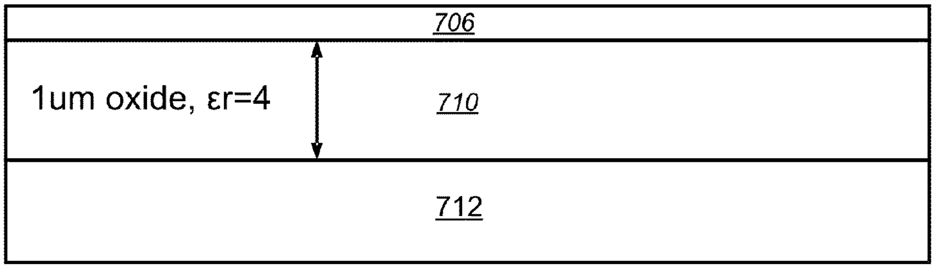
FIG. 7B is a schematic block diagram in cross-sectional view of the interconnect grid of FIG. 7A.
Figure 8:
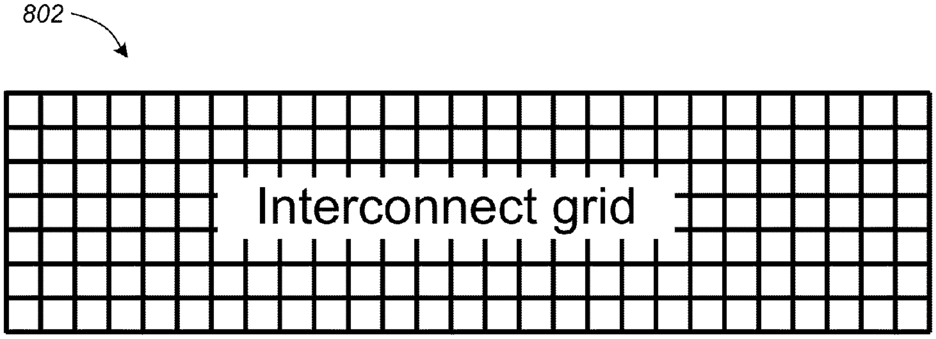
FIG. 8 is a schematic diagram in plan view of an interconnect grid according to an embodiment of the present disclosure.

Referring to FIG. 7A, in yet another aspect the present invention is directed to an array (not shown) of MEMS transducers 702 including an interconnect grid 704 for interconnecting the membrane electrodes 706 of substantially all or groups of MEMS transducers in the array. The interconnect grid 704 includes a high-temperature conductive material, such as polysilicon (poly), tungsten (W) or tungsten-silicide ($WSi_2$). In addition to simplifying electrical connections to the MEMS die 708, as noted above, interconnecting the membrane electrodes 706 reduces resistance and allows for 'ganged' operation of the substantially all or groups of MEMS transducers 702. Use of the interconnect grid 704, as opposed to an interconnect layer, and careful selection of the thickness and permittivity of a dielectric layer 710 separating the interconnect grid 704 from a lower or cavity electrode 712 can substantially eliminate capacitive coupling with the cavity electrode that might otherwise limit the maximum achievable frequency of the MEMS transducers 702. In particular, it has been found that an array having a 75% fill ration, and having a 6 kÅ thick, interconnect grid 704 covering about 10% surface and having a corner to center (of the interconnect grid) resistance of about 1 Ohm, and with an estimated capacitive coupling through a 1 μm oxide dielectric layer 710 of about 10 nanoFarads (nF), megasonic oscillations of up to about 5 MHz can still be achieved with a displacement current of 2.5 amperes (A) or less. FIG. 7B is a cross-sectional view of a portion of the interconnect grid 704 of FIG. 7A. FIG. 8 is a schematic diagram in plan view of an embodiment of an interconnect 802. Additional dimensions and RC considerations of the above described exemplary embodiment of the interconnect grid are summarized in Table II below.

TABLE II

| | | |
|---|---|---|
| X Dimension | mm | 10 |
| Y Dimension | mm | 40 |
| Bus width X | mm | 1 |
| Bus width Y | mm | 4 |
| Squares to center | squares | 20.0 |
| M1 Thickness | A | 6000 |
| Resistivity | ohm-cm | 3.0E−06 |
| Sheet resistance | ohm/square | 5.0E−02 |
| M1 Resistance | ohm | 1.0 |
| Dielectric Thickness | um | 1.0 |
| Dielectric constant | — | 4.0 |
| % overlap | % | 0.70 |
| Capactiance | nF | 10.0 |
| Operating voltage | V | 50 |
| Charge | C | 5.0E−07 |
| RC timeconstant | ns | 199.4 |
| Frequency | MHz | 5.0 |
| Surge current | A | 2.50 |

Figure 9:
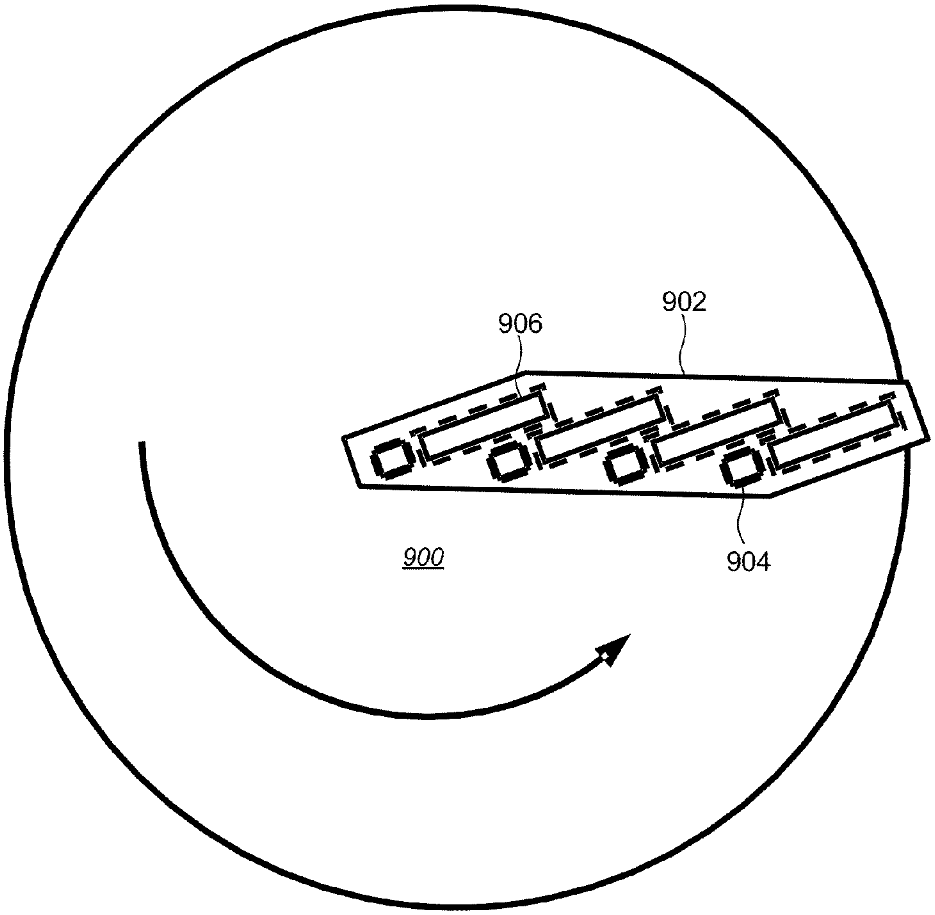
FIG. 9 is a top plan view of a megasonic system including a circuit board mounting a plurality of MEMS die according to an embodiment of the present disclosure.
Figure 10:
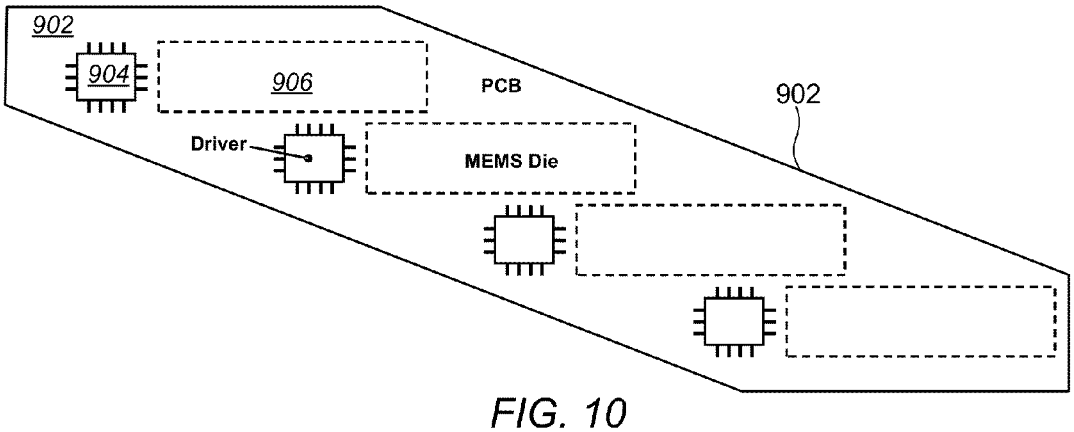
FIG. 10 is a schematic block diagram of the circuit board of FIG. 9.

Generally to provide the most complete and uniform cleaning of a target workpiece, it is desirable to provide a relative motion between the target workpiece and the MEMS transducers. Referring to FIGS. 9 and 10, in one embodiment wherein the target workpiece 900 is, for example, a substrate or semiconductor wafer, this can be accomplished by providing a PCB 902 with multiple drivers 904 and multiple MEMS die 906, each with one or more arrays of MEMS transducers. Generally, as in the embodiment show, the PCB 902 extends radially outward from a center of a rotating target workpiece 900. FIG. 10 is a schematic block diagram of the PCB 902 of MEMS die 906 of FIG. 9. Referring to FIG. 10, in the embodiment shown the drivers 904 are attached or mounted on a first or back surface of the PCB 902 while multiple overlapping MEMS die 906 (shown in phantom with dashed lines) are attached or mounted on a second or front surface of the PCB.

Figure 11:
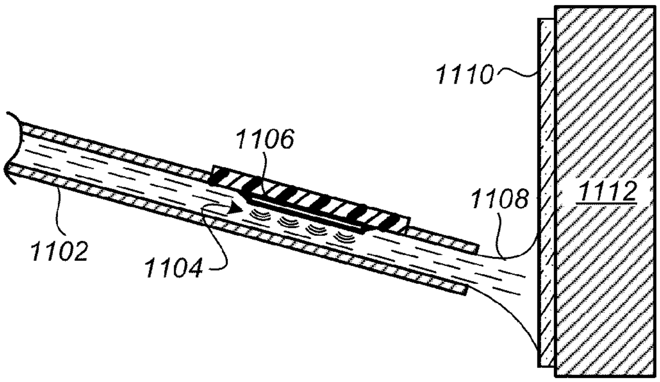
FIG. 11 is a schematic block diagram in cross-sectional view of a megasonic system according to an embodiment of the present disclosure in which sonic energy is coupled to a jet of fluid that is then directed at a target workpiece.

In yet another embodiment, shown in FIG. 11, the megasonic system 1100 can include one or more nozzles 1102 in which sonic energy 1104 from a MEMS die 1106 is coupled to a jet or stream of fluid 1108, which is then directed on to a target workpiece 1110 positioned or held on a chuck 1112.

Figure 12:
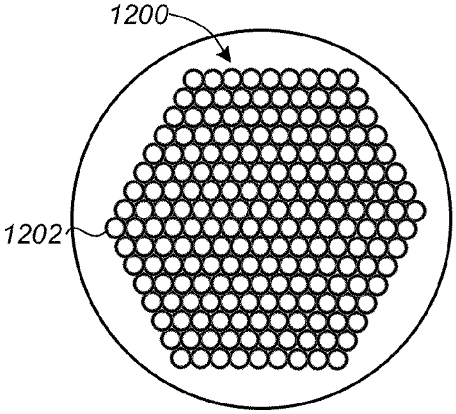
FIG. 12 is a top plan view of a close packed, hexagonal array of MEMS megasonic transducers according to an embodiment of the present disclosure.
Figure 13:
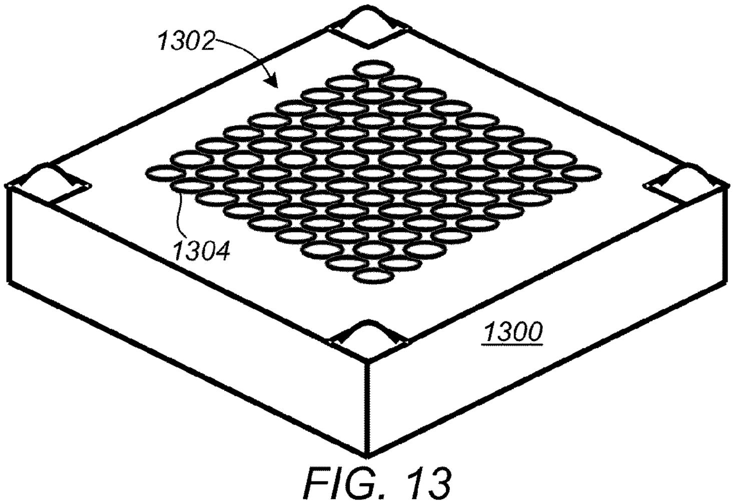
FIG. 13 is a perspective view of a square array of MEMS megasonic transducers according to another embodiment of the present disclosure.

Although the exemplary embodiments of the MEMS arrays described heretofore have included arrays having a rectangular shape, it will be appreciated that this need not be the case, and the MEMS transducers can be located on the die to form a triangular, square, hexagonal or other polygonal shaped array. In particular, FIG. 12 is a top plan view of a close packed, hexagonal array 1200 of MEMS megasonic transducers 1202 according to an embodiment of the present disclosure. FIG. 13 is a perspective view of a MEMS die 1300 including a square array 1302 of MEMS megasonic transducers 1304 according to another embodiment of the present disclosure.

A method for cleaning a workpiece using an array of megasonic MEMS transducers described above will now be described with reference to the flowchart of FIG. 14.

Figure 14:
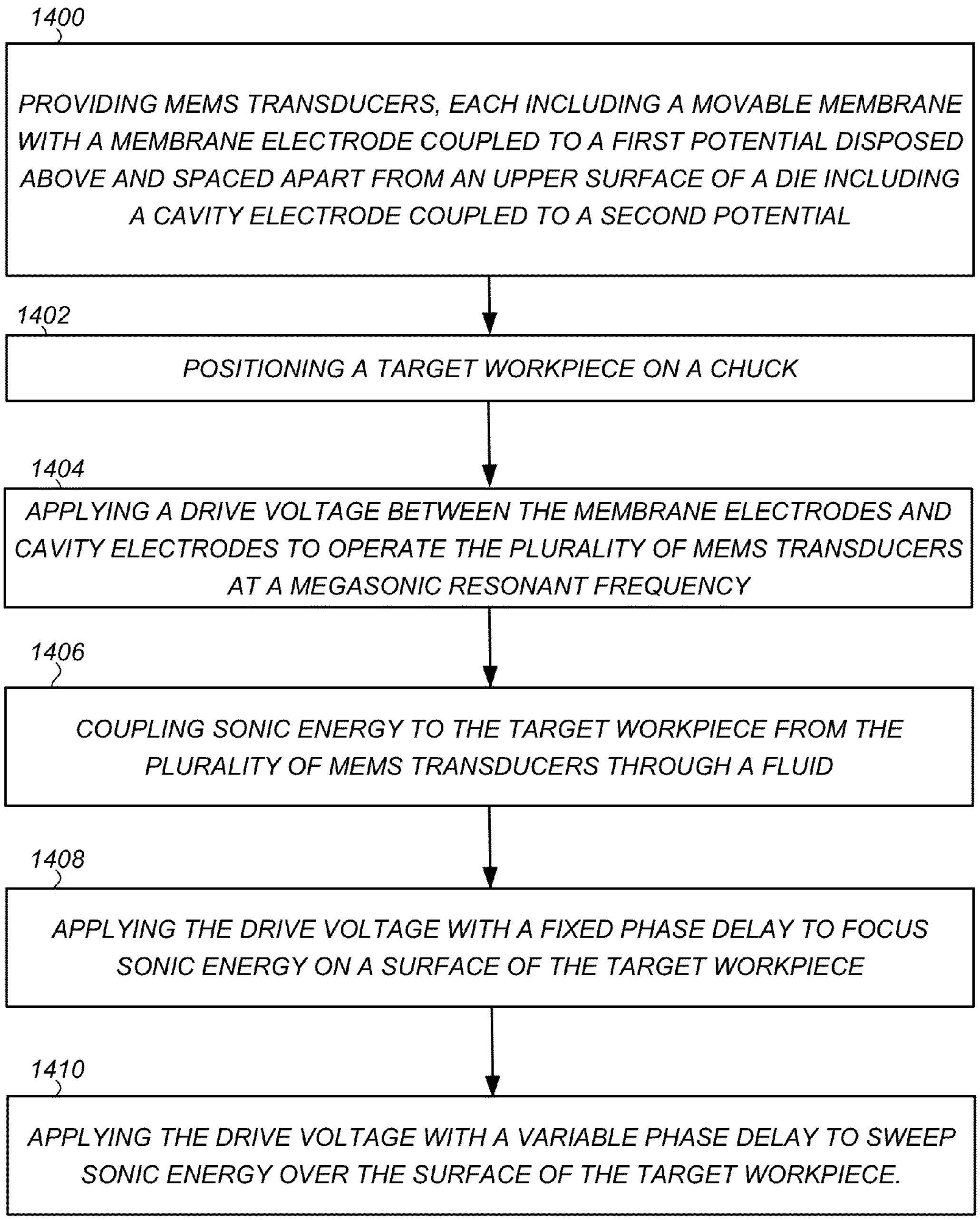
FIG. 14 is a flowchart illustrating a method of cleaning a workpiece using a MEMS transducers according to an embodiment of the present disclosure.

Referring to FIG. 14, the method begins with providing a plurality of MEMS transducers, each including a movable membrane with a membrane electrode coupled to a first potential disposed above and spaced apart from an upper surface of a die including a cavity electrode coupled to a second potential. (Step 1400) A target workpiece is then positioned on a chuck proximal to the MEMS transducers. (Step 1402) Next, a drive voltage is applied between the membrane electrodes and cavity electrodes to operate the MEMS transducers at a megasonic resonant frequency (Step 1404), and coupling sonic energy to the target workpiece from the MEMS transducers through a fluid. (Step 1406)

Figure 15:
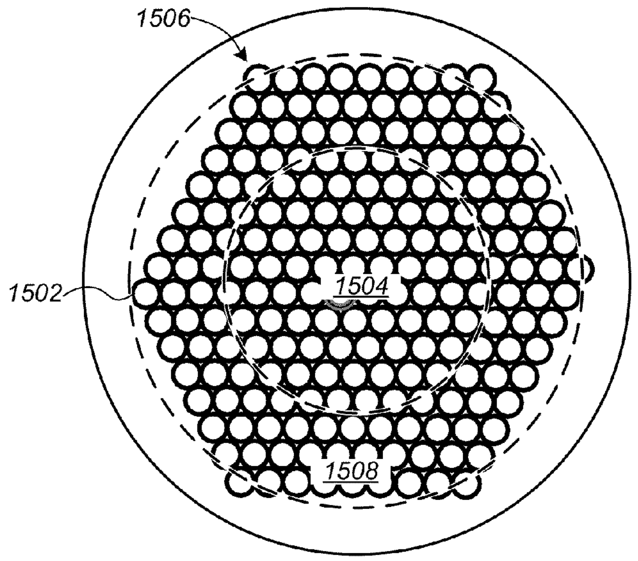
FIG. 15 is a schematic block diagram illustrating an embodiment of method for applying a drive voltage having a fixed phase delay to focus sonic energy on a target workpiece.
Figure 16:
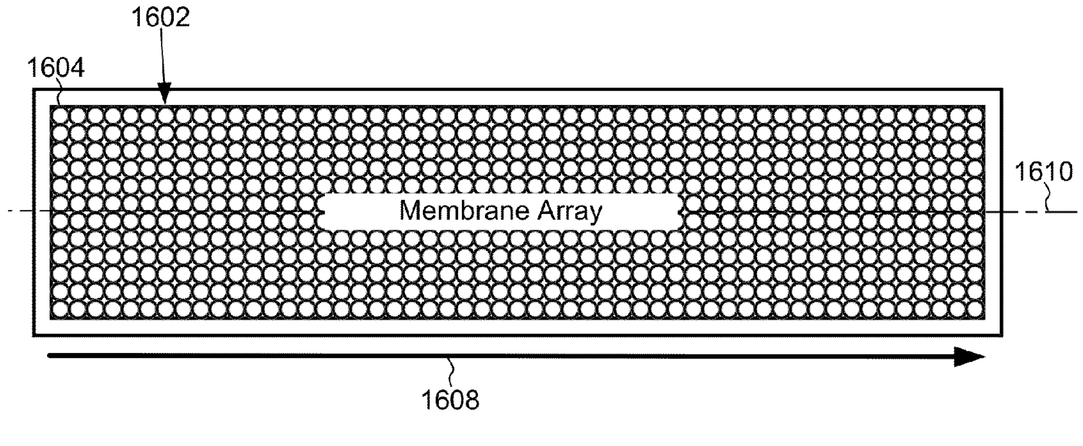
FIG. 16 is a schematic block diagram illustrating an embodiment of method for applying a drive voltage having a variable phase delay to sweep sonic energy across the surface of the target workpiece.

Optionally, a phase of the drive voltage is applied to a first number or group of MEMS transducers can be varied radially relative to that supplied to a second number or group of MEMS transducers to achieve phased-array focusing of sonic energy emitted from the MEMS transducers on the target workpiece. (Step 1408) An example of this embodiment is shown in FIG. 15. Referring to FIG. 15, the phase of a drive voltage applied to one or more MEMS transducers 1502 near a center 1504 of an array 1506 can be delayed with a fixed phase delay relative to other MEMS transducers near an outer edge 1508 of the array to generate a peak of sonic energy that focuses sonic energy on a target workpiece.

Alternatively or additionally, the phase of the drive voltage is applied to a first number of MEMS transducers can be temporally varied relative to that supplied to the second number of MEMS transducers to sweep sonic energy emitted from the MEMS transducers across a surface of the target workpiece. (Step 1410) For example, referring to FIG. 16 the drive voltage can be applied to one or more consecutive rows 1602 of MEMS transducers 1604 in a rectangular array 1606 can be delayed relative to other rows of to generate a peak of sonic energy (represented by arrow 1608) that moves sequentially along an axis 1610 of the array perpendicular to the rows to sweep sonic energy across the surface of the target workpiece.

An embodiment of a method or process for fabricating megasonic MEMS transducers according to the present invention will now be described with reference to FIGS. 17A-G. FIGS. 17A-G illustrate several sectional side views of after a number of processing steps, the end of result of which is to produce a MEMS transducer similar to those shown in FIGS. 2 and 7A. One process sequence is as follows.

Figure 17A:
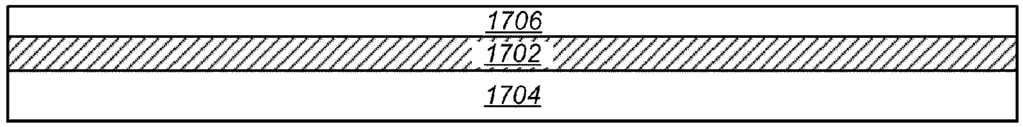
FIGS. 17A-G are schematic block diagrams illustrating a process for fabricating MEMS transducers according to an embodiment of the present disclosure.

Referring to FIG. 17A, a lower or cavity electrode 1702 is formed on or over a surface of a semiconductor substrate 1704, such as a silicon wafer, and a dielectric layer 1706 formed thereover. Although in the embodiment shown the cavity electrode 1702 is formed directly on the surface of the semiconductor substrate 1704, it will be understood that the cavity electrode can also be formed on a dielectric layer formed over the surface of the semiconductor substrate. This embodiment is particularly useful in those embodiments where CMOS or other semiconductor circuits, such as a driver, are integrally formed in the substrate prior to or concurrently with the fabrication of the MEMS transducers. The cavity electrode 1702 can include a high-temperature metal, such as tungsten or tungsten-silicide ($WiSi_2$), deposited by physical vapor deposition, or a polysilicon deposited by chemical vapor deposition (CVD). The dielectric layer 1706 can include an oxide, such as a silicon dioxide, deposited by CVD or thermally grown.

Figure 17B:
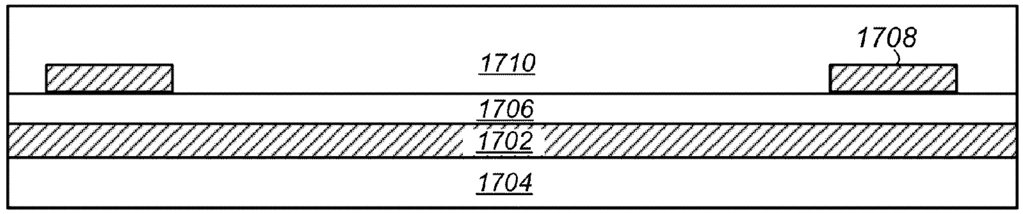

Referring to FIG. 17B, an interconnect grid 1708 is formed on or over the dielectric layer 1706 and a sacrificial layer 1710 formed over the interconnect grid and dielectric layer. The interconnect grid 1708 can be formed by patterning a layer of conducting material using standard photolithographic techniques. The conducting material can include metal, such as tungsten or tungsten-silicide ($WiSi_2$), deposited by chemical or physical vapor deposition, or a polysilicon deposited by CVD. The sacrificial layer 1710 can include amorphous silicon deposited by CVD. By standard photolithographic techniques it is meant a process using a light-sensitive photoresist followed by a number of developing, wet or dry etching and resist stripping process to selectively remove parts of the underlying layer(s) to transfer a pattern thereto.

Figure 17C:
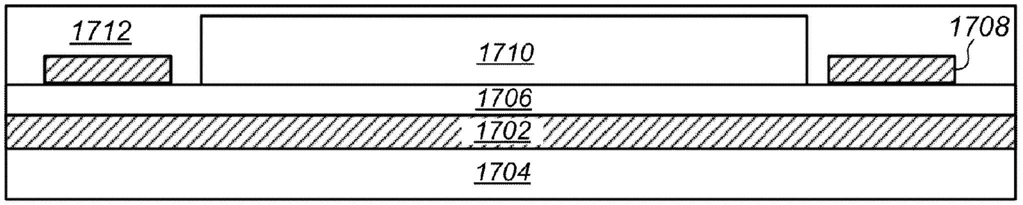

Referring to FIG. 17C, the sacrificial layer 1710 is patterned using standard photolithographic techniques, a silicon nitride layer 1712 deposited using low pressure chemical vapor deposition (LPCVD) or plasma enhanced chemical vapor deposition (PECVD) to form a number of support structures and a first or bottom silicon nitride layer of a multi-layer membrane. Preferably, the silicon nitride layer 1712 is deposited under conditions selected to produce a taut silicon nitride having a high intrinsic stress sufficient to provide a substantially flat, elastic movable membrane.

Figure 17D:
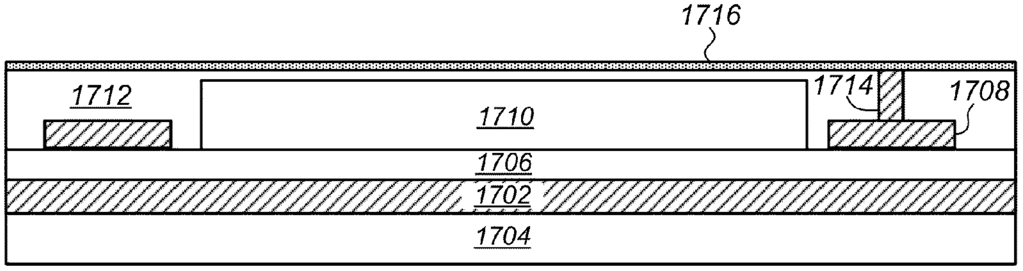

Referring to FIG. 17D, the silicon nitride layer 1712 is patterned using standard photolithographic techniques, and a metal deposited therein to form an electrical contact 1714 to electrically couple the interconnect grid 1708 to a membrane electrode 1716 formed on the top surface of the silicon nitride layer 1712. The membrane electrode 1716 can include metal, such as tungsten or tungsten-silicide ($WiSi_2$), deposited by chemical or physical vapor deposition, or a polysilicon layer deposited by CVD.

Figure 17E:
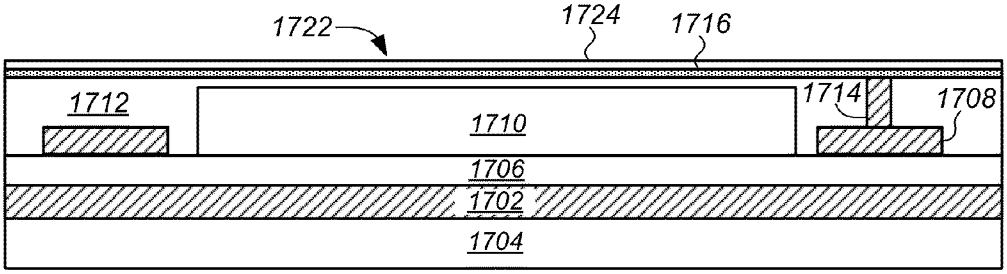

Referring to FIG. 17E, a second silicon nitride layer 1724 deposited to form a top silicon nitride layer of a multi-layer membrane 1722. As with the first silicon nitride layer 1712, the second silicon nitride layer 1724 can be deposited by LPCVD or PECVD under conditions selected to produce a taut silicon nitride having a high intrinsic stress sufficient to provide a substantially flat, elastic movable membrane 1722.

Figure 17F:
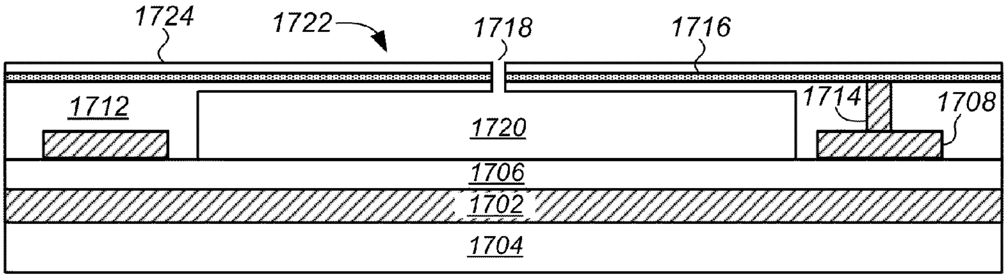

Referring to FIG. 17F, a number of openings 1718 are etched through the second silicon nitride layer 1724, the membrane electrode 1716 and first silicon nitride layer 1712 to expose a portion of the sacrificial layer 1710, and the sacrificial layer removed to form a cavity 1720 and release the movable membrane 1722. In one embodiment, in which the sacrificial layer 1710 includes amorphous silicon, it is removed using Xenon difluoride ($XeF_2$) chemistry with a high selectivity to the silicon nitride layer 1712, the dielectric layer 1706, and the material of the membrane electrode 1716.

Figure 17G:
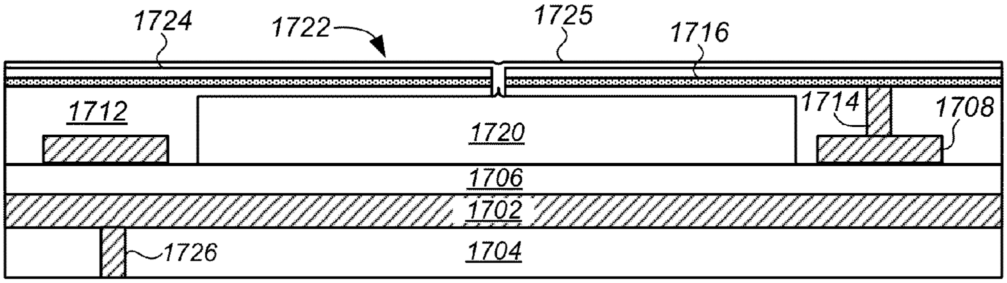

Referring to FIG. 17G, the openings 1718 are sealed by deposition of a thin layer or small amount of lugging material 1725. Suitable lugging materials include aluminum (Al)

deposited by sputter deposition in an argon (Ar) environment. Finally, one or more vertical contacts 1726 are formed extending through a backside or surface of the substrate 1704 to electrically couple to the cavity electrodes 1702 and to the interconnect grid 1708.

Figure 18:
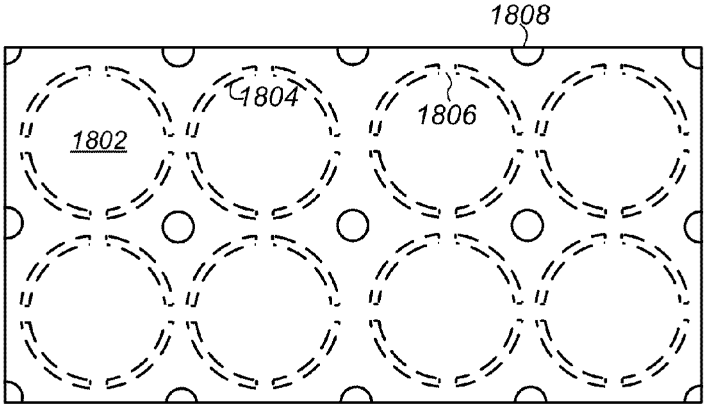
FIG. 18 is a schematic block diagram in plan view illustrating another process for fabricating MEMS transducers according to another embodiment of the present disclosure.

FIG. 18 illustrates another process for fabricating MEMS transducers according to another embodiment of the present disclosure. Referring to FIG. 18, in this embodiment, movable membranes 1802 are supported above a cavity (not shown in this figure) by a plurality of support structures 1804 having a number of openings or passages 1806 there through so that the sacrificial layer (not shown in this figure) can be removed through openings 1808 located between the movable membranes, thereby avoiding the need to form openings extending through the movable membranes. As with the openings 1718 of FIG. 17E, the openings 1808 can be sealed by deposition of a lugging material (not shown in this figure).

Thus, embodiments of megasonic systems including MEMS transducers and methods of fabricating and using the same have been described. Although the present disclosure has been described with reference to specific exemplary embodiments, it will be evident that various modifications and changes may be made to these embodiments without departing from the broader spirit and scope of the disclosure. Accordingly, the specification and drawings are to be regarded in an illustrative rather than a restrictive sense.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

In the forgoing description, for purposes of explanation, numerous specific details have been set forth in order to provide a thorough understanding of the system and method of the present disclosure. It will be evident however to one skilled in the art that the present interface device and method may be practiced without these specific details. In other instances, well-known structures, and techniques are not shown in detail or are shown in block diagram form in order to avoid unnecessarily obscuring an understanding of this description.

Reference in the description to "one embodiment" or "an embodiment" means that a particular feature, structure, or characteristic described in connection with the embodiment is included in at least one embodiment of the system or method. The appearances of the phrase "one embodiment" in various places in the specification do not necessarily all refer to the same embodiment. The term "to couple" as used herein may include both to directly electrically connect two or more components or elements and to indirectly connect through one or more intervening components.

What is claimed is:

1. A system comprising:

a plurality of Micro-Electromechanical System (MEMS) transducers, each transducer including a movable membrane with a membrane electrode coupled to a first potential disposed above and spaced apart from an upper surface of a die including a cavity electrode coupled to a second potential, the membrane including multiple layers including a polysilicon layer between a top silicon nitride layer and a bottom silicon nitride layer, and the membrane electrode includes the polysilicon layer;

a chuck on which a target workpiece is positioned; and a fluid to couple sonic energy from the plurality of MEMS transducers to the target workpiece.

2. The system of claim 1, further comprising a driver adapted to apply a drive voltage with a variable phase delay in the drive voltage applied to a first number of the plurality of MEMS transducers from that supplied to a second number of MEMS transducers to focus sonic energy emitted from the plurality of MEMS transducers.

3. The system of claim 1, wherein the die is attached to a surface of a printed circuit board and the plurality of MEMS transducers are electrically coupled to a driver attached to the circuit board, and further comprising a mechanical backing plate attached to a back surface of the circuit board opposite the surface to which the die is attached.

4. The system of claim 3, wherein the driver is attached to the back surface of the circuit board and enclosed by the mechanical backing plate.

5. The system of claim 3, wherein the membrane electrodes are coupled to the first potential through an interconnect grid on the upper surface of the die, and wherein the cavity electrodes are coupled to the second potential through electrical connections to pads on a backside of the die.

6. The system of claim 5, wherein the interconnect grid on the upper surface of the die is separated from the cavity electrodes in the die by an oxide layer at least 1 μm thick to reduce coupling capacitance there between.

7. The system of claim 6, wherein the interconnect grid covers less than 25% of the upper surface of the die.

8. The system of claim 3, further comprising a reservoir containing the fluid in which the die and the target workpiece is exposed, and further comprising a mechanism to provide relative motion between the target workpiece and the plurality of MEMS transducers on the die.

9. The system of claim 1, further comprising a nozzle to direct the fluid to the target workpiece, and wherein the sonic energy is coupled to the fluid in the nozzle.

10. The system of claim 1, wherein the movable membrane comprises a substantially circular surface, and wherein a diameter of the circular surface is selected to provide the MEMS transducers with a megasonic resonant frequency of from about 3 to about 10 megahertz (MHz).

11. The system of claim 10, wherein the circular surface has a diameter of from about 3 to about 100 micrometers (μm).

12. A system comprising:

a plurality of Micro-Electromechanical System (MEMS) transducers, each transducer including a movable membrane with a membrane electrode coupled to a first potential disposed above and spaced apart from an upper surface of a die including a cavity electrode coupled to a second potential, the membrane including multiple layers including a polysilicon layer between a top silicon nitride layer and a bottom silicon nitride layer, and the membrane electrode includes the polysilicon layer;

an interconnect grid on the upper surface of the die through which the membrane electrodes are coupled to the first potential;

a circuit board including a surface to which the die is attached;

a driver attached to the circuit board and electrically coupled to the plurality of MEMS transducers to apply a drive voltage between the membrane electrodes and cavity electrodes to operate the plurality of MEMS transducers at a megasonic resonant frequency; and a chuck on which a target workpiece is positioned.

13. The system of claim 12, wherein the driver is adapted to apply a drive voltage with a variable phase delay in the drive voltage applied to a first number of the plurality of MEMS transducers from that supplied to a second number of MEMS transducers to sweep sonic energy emitted from the plurality of MEMS transducers over a surface of the target workpiece.

* * * * *